(12) United States Patent
Afzali-Ardakani et al.

(10) Patent No.: US 8,835,686 B2
(45) Date of Patent: Sep. 16, 2014

(54) CONTROLLED ASSEMBLY OF CHARGED NANOPARTICLES USING FUNCTIONALIZED GRAPHENE NANOMESH

(75) Inventors: Ali Afzali-Ardakani, Ossining, NY (US); Ahmed Maarouf, Mohegan Lake, NY (US); Glenn J. Martyna, Croton on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 13/302,242

(22) Filed: Nov. 22, 2011

(65) Prior Publication Data

US 2013/0131383 A1    May 23, 2013

(51) Int. Cl.
*C07C 209/60* (2006.01)
*C07C 37/66* (2006.01)
*B82Y 30/00* (2011.01)
*B82Y 40/00* (2011.01)
*B82B 3/00* (2006.01)

(52) U.S. Cl.
CPC .............. *B82B 3/0057* (2013.01); *B82Y 30/00* (2013.01); *B82Y 40/00* (2013.01); *Y10S 977/734* (2013.01); *Y10S 977/788* (2013.01); *Y10S 977/846* (2013.01)
USPC ........... 564/283; 568/723; 977/734; 977/788; 977/846

(58) Field of Classification Search
CPC ....... B82Y 30/00; B82Y 40/00; B82B 3/0057
USPC ......................................... 977/755; 564/281
See application file for complete search history.

(56) References Cited

PUBLICATIONS

Li et al., Large-Area Synthesis of High-Quality and Uniform Graphene Films on Copper Foils, Science 324, 1312 (2009), pp. 1312-1314.
Bai et al., Graphene Nanomesh, Nature Nanotechnology 5, 190 (2010), pp. 190-194.
Martinazzo et al., Symmetry Induced Bang-gap Openning in Graphene Superlattices, Phys. Rev. B81, 245420 (2010), pp. 1-31.
Pederson et al., Graphene Antidot Lattices: Designed Defects and Spin Qubits, Phys. Rev. Lett. 100, 136804 (2008), pp. 1-4.

*Primary Examiner* — Yong Chu
(74) *Attorney, Agent, or Firm* — Ryan, Mason & Lewis, LLP

(57) ABSTRACT

A method, an apparatus and an article of manufacture for attracting charged nanoparticles using a graphene nanomesh. The method includes creating a graphene nanomesh by generating multiple holes in graphene, wherein each of the multiple holes is of a size appropriate to a targeted charged nanoparticle, selectively passivating the multiple holes of the graphene nanomesh to form a charged ring in the graphene nanomesh by treating the graphene nanomesh with chemistry yielding a trap with an opposite charge to that of the targeted nanoparticle, and electrostatically attracting the target charged nanoparticle to the oppositely charged ring to facilitate docking of the charged nanoparticle to the graphene nanomesh.

19 Claims, 6 Drawing Sheets

SCHEME A

SCHEME B

CONTROLLED ASSEMBLY OF CHARGED NANOPARTICLES USING FUNCTIONALIZED GRAPHENE NANOMESH

FIELD OF THE INVENTION

Embodiments of the invention generally relate to electronic devices and, more particularly, to assembling charged nanoparticles.

BACKGROUND OF THE INVENTION

Presently, there are many industrial applications that involve the assembly of charged nanoparticles. The weak coupling between these particles or between the particles and the substrate leads to structural instabilities and/or variations which may lead to fluctuation in the desired physical and/or chemical properties of such systems. Accordingly, there is a need for controlling the assembly of such nanosystems to achieve highly stable structures.

SUMMARY OF THE INVENTION

In one aspect of the invention, a method for assembly of charged nanoparticles using functionalized graphene nanomesh is provided. The method includes the steps of creating a graphene nanomesh by generating multiple holes in graphene, wherein each of the multiple holes is of a size appropriate to a targeted charged nanoparticle, selectively passivating the multiple holes of the graphene nanomesh to form a charged ring in the graphene nanomesh by treating the graphene nanomesh with chemistry yielding a trap with an opposite charge to that of the targeted nanoparticle, and electrostatically attracting the target charged nanoparticle to the oppositely charged ring to facilitate docking of the charged nanoparticle to the graphene nanomesh.

Another aspect of the invention includes a functionalized graphene nanomesh for attracting positively charged nanoparticles, which includes a graphene sheet with multiple holes generated thereon to form a graphene nanomesh, wherein each of the multiple holes is of a size appropriate to a targeted positively charged nanoparticle, and a negatively charged ring formed in each hole in the graphene nanomesh by selectively passivating the multiple holes followed by a treatment with a base.

Yet another aspect of the invention includes a functionalized graphene nanomesh for attracting negatively charged nanoparticles, which includes a graphene sheet with multiple holes generated thereon to form a graphene nanomesh, wherein each of the multiple holes is of a size appropriate to a targeted negatively charged nanoparticle, and an amine functionalized graphene nanomesh rendered positively charged with treatment with an acid.

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
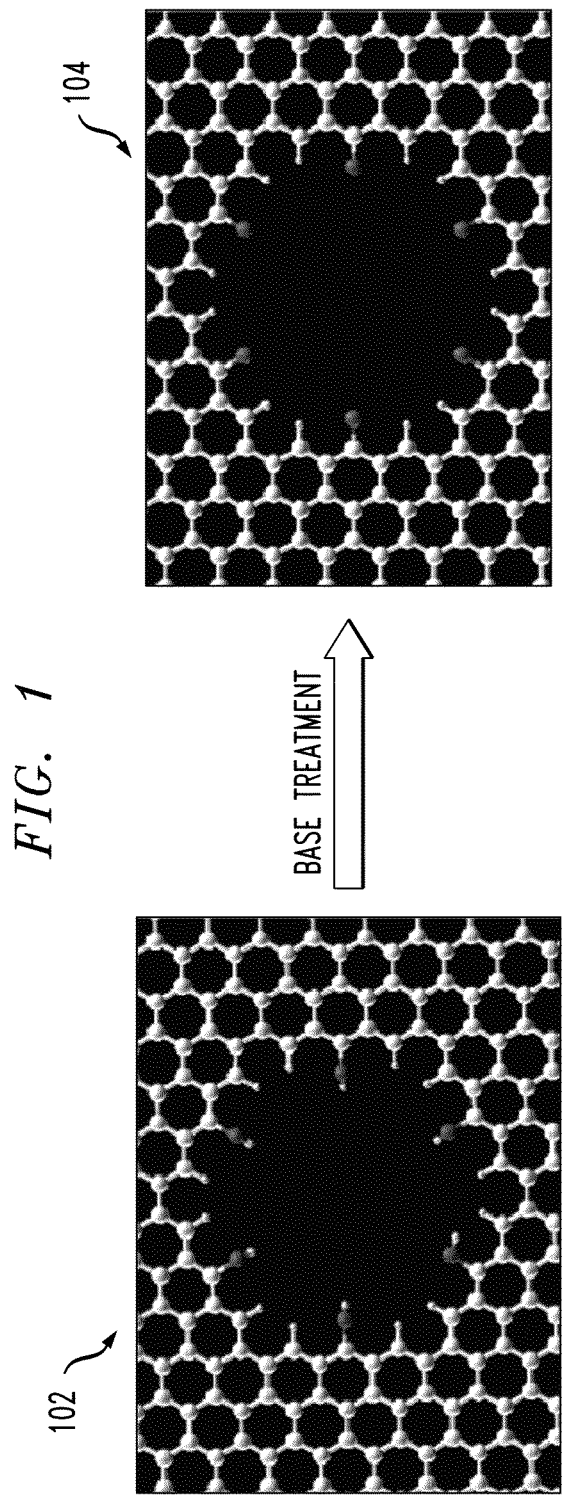
FIG. 1 is a diagram illustrating a negative trap, according to an embodiment of the present invention.

An aspect of the invention includes techniques for controlled assembly of charged nanoparticles using functionalized graphene nanomesh (GNM). As detailed herein, using a functionalized graphene nanomesh system provides electrostatic binding sites to charges nanoparticles. Such techniques include creating a graphene nanomesh functionalized in a way that can form a charged "ring."

A trap for positively charged nanoparticles can be created by forming nanometer sized holes in a graphene sheet, for example, using plasma etching or an electron beam. During the plasma etching of the graphene sheet to form nanomesh, free radical carbons are formed at the edge of the nanomesh (for example, as represented by structure I in schemes A and B depicted in FIG. 8 and FIG. 9, respectively). These free radicals are highly reactive and depending to what chemicals they are exposed, they can be converted to many functionalities. The charge is concentrated in the edge of the nanopores, and these charged nests are the "docking" positions of the targeted charged nanoparticles. The docket occurs using the electrostatic attraction between the charged nanoparticles and the oppositely charged hole.

Graphene nanomeshes are carbon based structures that are made by creating holes in graphene. Three geometrical parameters characterize a GNM: hole size, shape, and lattice constant. Depending on these parameters, the GNM may be intrinsically semiconducting with a non-zero gap (unlike graphene which has a zero gap with a vanishing density of states (DOS)), or quasi-metallic like graphene, with a vanishing DOS at the Fermi energy. By way of example, if a triangular lattice of holes is created with a lattice constant that is not a multiple of three of the graphene lattice constant, the generated GNM is metallic; otherwise, the GNM is semiconducting with a non-zero electronic gap.

The creation or generating of the holes leaves active carbon sites at the edges of the holes. The holes are created, for example, using electron beam techniques or via plasma etching. Also, by selective passivation of these holes, the termination of the carbon dangling bonds can be controlled, leading, in some cases, to the doping of the graphene sheet. As used herein, dangling carbon bonds are under-bonded carbon atoms that are very reactive. Additionally, as detailed herein, selective passivation of such bonds can be achieved by controlling the environment in which the holes are created. By way of example, generating the holes in air leads to the passivation of each hole with O, H and OH groups.

In contrast to existing approaches, an aspect of the present invention includes structural control of the locations formed by the targeted nanoparticles. As the size and locations of the nanopores can be accurately chosen, the resulting final shape of the nanoparticles can be highly controlled.

Additionally, an aspect of the invention includes providing structural stability in the formed nanolayer. The electrostatic interaction between the nanoparticles and the nanopores guarantees a certain level of stability due to the relatively high binding energy between the nanoparticles and the functional groups in the edge of the holes. Such an interaction can be tailored to best suit the nanoparticles of interest via a customized choice of the functional groups passivating the hole edges. Further, at least one embodiment of the invention can include forming positively and negatively charged graphene nests, or a hybrid of both in applications where different nanoparticle species are required.

The techniques described herein also include creating a GNM with a size appropriate to a targeted charged particle molecule (for example, approximately 5-20 nanometers (nm)). Nanoparticle size is application dependent. Whatever the size is, the holes are to be created to match that size. As such, passivation does not necessarily depend on the nanoparticle size. The GNM is passivated so as to allow for additional chemistry (for example, by creating the holes in air or in ammonia atmospheres). Such chemistry includes forming charged rings in the nanopores by treating the GNM with appropriate chemistry (for example, acid or base). This is additionally explained in connection with FIG. 8 and FIG. 9 herein. The targeted charged nanoparticles are electrostatically attracted to the oppositely charged nests, thereby docking in those locations.

FIG. 1 is a diagram illustrating a negative trap, according to an embodiment of the present invention. By way of illustration, FIG. 1 depicts a negative trap made from a GNM created in air 102 and treated with a base 104.

As illustrated in FIG. 1, an embodiment of the invention includes creating the GNMs with a hole size and hole lattice constant that is appropriate for the targeted nanoparticles. By way of example, hole size can be in the range of approximately 5-50 nm. Further, the GNMs are passivated in a specific way to allow for charging chemistry (for example, by creating the holes in air or in ammonia atmospheres). Creating the GNM with the desired hole size in a water vapor environment leads to the passivation of the edges of the hole by "H," "O," or "OH" groups.

By treating such holes with a base, a ring of negative charge can be formed around the perimeter of the hole. FIG. 1 depicts the system before (102) and after (104) the base treatment. This case forms an example for the formation of a negatively charged nest for trapping positively charged nanoparticles.

Figure 2:
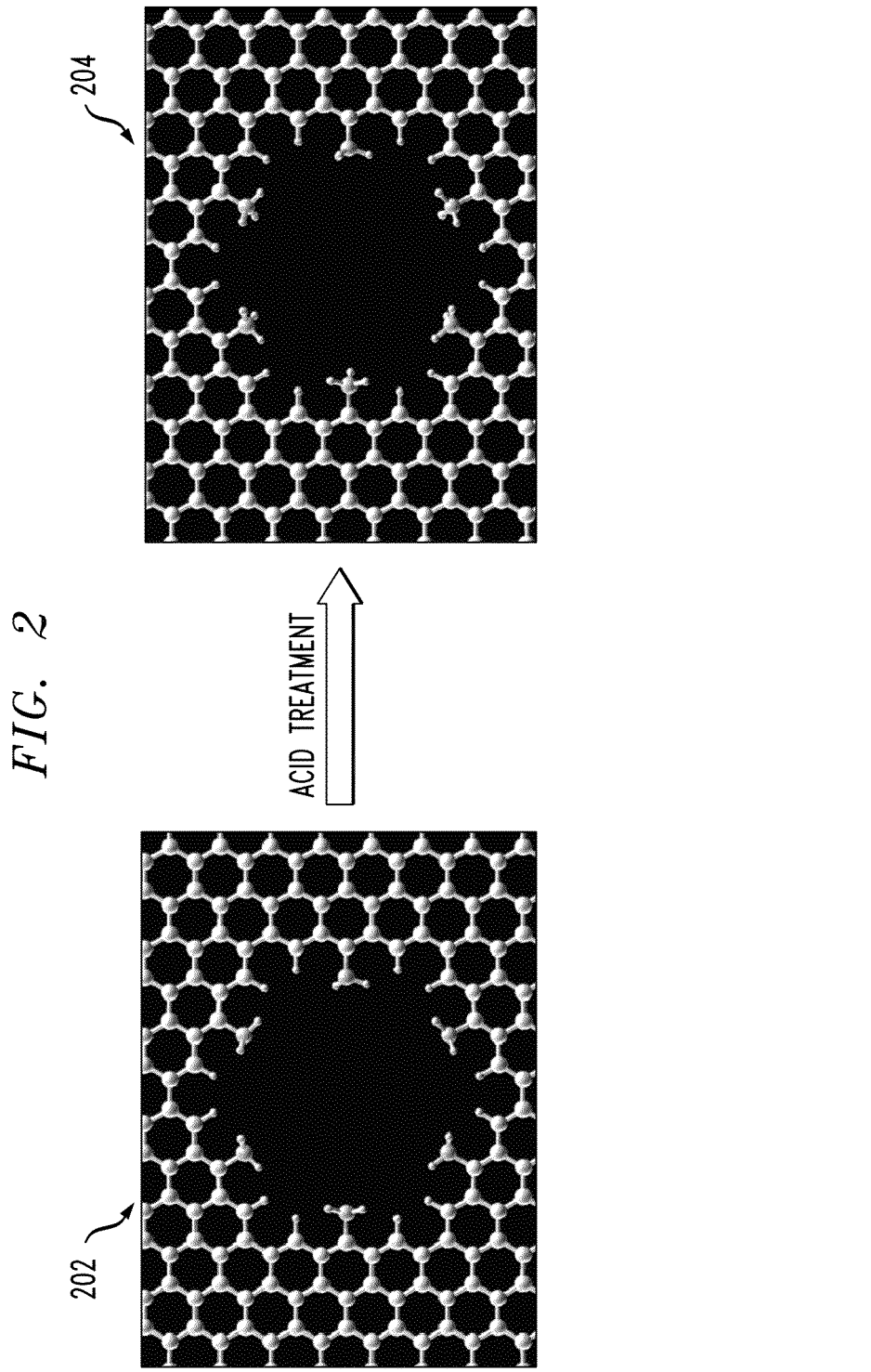
FIG. 2 is a diagram illustrating a positive trap, according to an embodiment of the present invention.

FIG. 2 is a diagram illustrating a positive trap, according to an embodiment of the present invention. By way of illustration, FIG. 2 depicts a positive trap made from a GNM created in ammonia 202 and treated with an acid 204.

As illustrated in FIG. 2, in such an embodiment, the GNM can be created in an ammonia atmosphere. As a result, carbon atoms along the edge of the nanopores are passivated by "H" and "$NH_2$" groups. Such a system can be referred to herein as $GNM-NH_2$. To create the positively charged trap, an embodiment of the invention can follow two paths.

One path includes treating the $GNM-NH_2$ with an acid such as, for example, HX, where X is a halogen. The second path includes treating the $GNM-NH_2$ with alkyl halides. The following capture these two reactions:

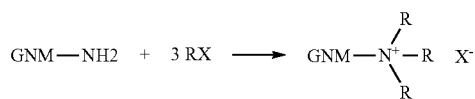

where R is an alkyl. Subsequently, the GNM is functionalized with a positively charged ammonium salt as shown in FIG. 2 (the surrounding X− anions are not shown.), or by a quaternary ammonium salt.

Additionally, by introducing a weaker base solution such as sodium citrate with some nanoparticles (for example, gold nanoparticles), the following exchange reaction occurs:

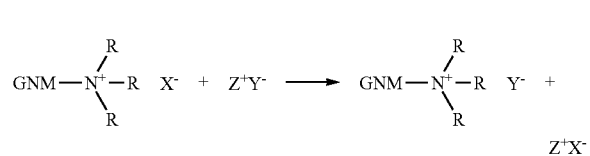

where Z+ refers to the Na+ ions, or in general, to any cation, and the Y− refers to the citrate-gold-nanoparticles system. As a result, the (negatively charged) nanoparticles electrostatically dock in the (positively charged) nanopores of the GNM. In addition to trapping charged nanoparticles, this technique can be used to trap DNA, organic molecules, or any other charged species.

Figure 3:
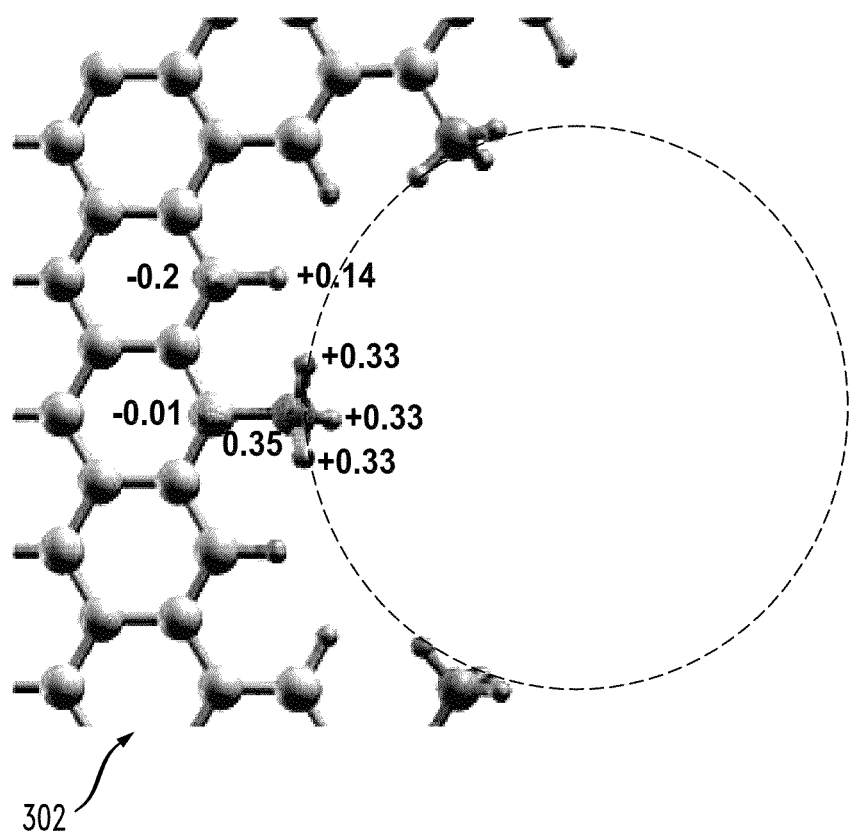
FIG. 3 is a diagram illustrating distribution of electronic charge in the vicinity of the nanopore edges for the case of a positive trap, according to an embodiment of the present invention.

FIG. 3 is a diagram illustrating distribution of electronic charge in the vicinity of the nanopore edges for the case of a positive trap, according to an embodiment of the present invention. As detailed herein, a similar path for trapping positively charged nanoparticles is possible, where the acid/base treatments are appropriately reversed to create the desired charge arrangement.

By way of illustration, in FIG. 3, first principles calculations were used to calculate the charges in the vicinity of the nanopore of a $GNM-NH_2$ 302 after treatment with HCl to form a positive trap. The calculations in FIG. 3 are quantum mechanical calculations that determine the electronic properties of such a system and allow for the calculation of various relevant physical quantities, such as bond strengths and electronic charge distributions.

Figure 6:
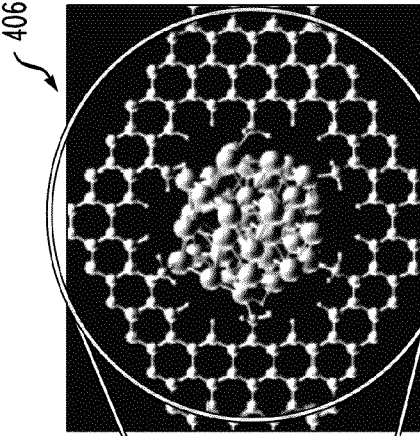
FIG. 6 is a diagram illustrating example nanoparticles, according to an embodiment of the present invention.
Figure 5:
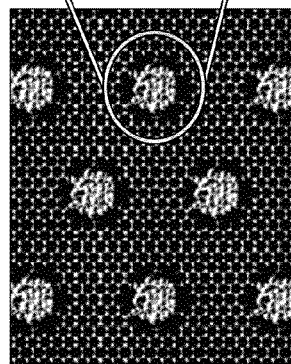
FIG. 5 is a diagram illustrating example nanoparticles, according to an embodiment of the present invention.
Figure 4:
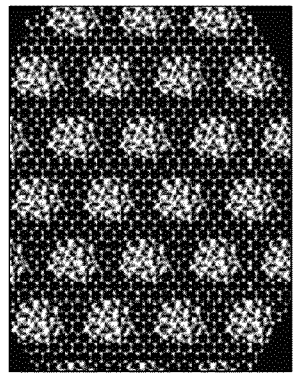
FIG. 4 is a diagram illustrating example nanoparticles, according to an embodiment of the present invention.

FIG. 4, FIG. 5 and FIG. 6 illustrate example nanoparticles, according to an embodiment of the present invention. By way of illustration, FIG. 4 depicts a 1 nm Pt particle on regular graphene 402. FIG. 5 depicts a platinum (Pt) nanoparticle on a GNM-NH2 system 404, and FIG. 6 also depicts a Pt nanoparticle on a $GNM-NH_2$ system 406. FIG. 4 shows the Pt nanoparticle on regular graphene as one system, used for comparison purposes to the GNM-based techniques depicted in FIG. 5 and FIG. 6. Accordingly, FIG. 5 depicts the GNM-based system with the higher (that is, higher than in FIG. 4) binding energy between the GNM and the Pt nanoparticle. FIG. 6 is a zoom-in on the docking site as shown in FIG. 5.

Additionally, in accordance with an aspect of the invention, the binding energy per bond for a 1.1 nm platinum particle on graphene and on a $GNM-NH_2$ trap can be calculated, as illustrated in FIG. 4 and FIG. 5, respectively. As noted in FIG. 4, the binding energy per bond for a 1.1 nm platinum particle on graphene is −2 electron volts (eV), while in FIG. 5, it is noted that the binding energy per bond for a 1.1 nm platinum particle on a $GNM-NH_2$ trap is −4 eV. The binding energy per bond can be taken as a measure for the stability of the Pt nanoparticle on the graphene or GNM support. The higher the binding energy per bond, the more stable the Pt nanoparticle.

Accordingly, the binding energy per bond between the Pt nanoparticle and the GNM-NH$_2$ support is twice that between the same nanoparticle and regular graphene. This is attributed to the docking of the Pt nanoparticle and the binding between the Pt atoms and the NH$_2$ group of the functionalized GNM. Ab-initio molecular dynamics show that the two hydrogen atoms in H$_2$ in the NH$_2$ group leave the N atom and attach themselves to the body of the Pt nanoparticle. This results in a strong chemical bonding between the Pt atoms and edges of the nanoholes.

Figure 7:
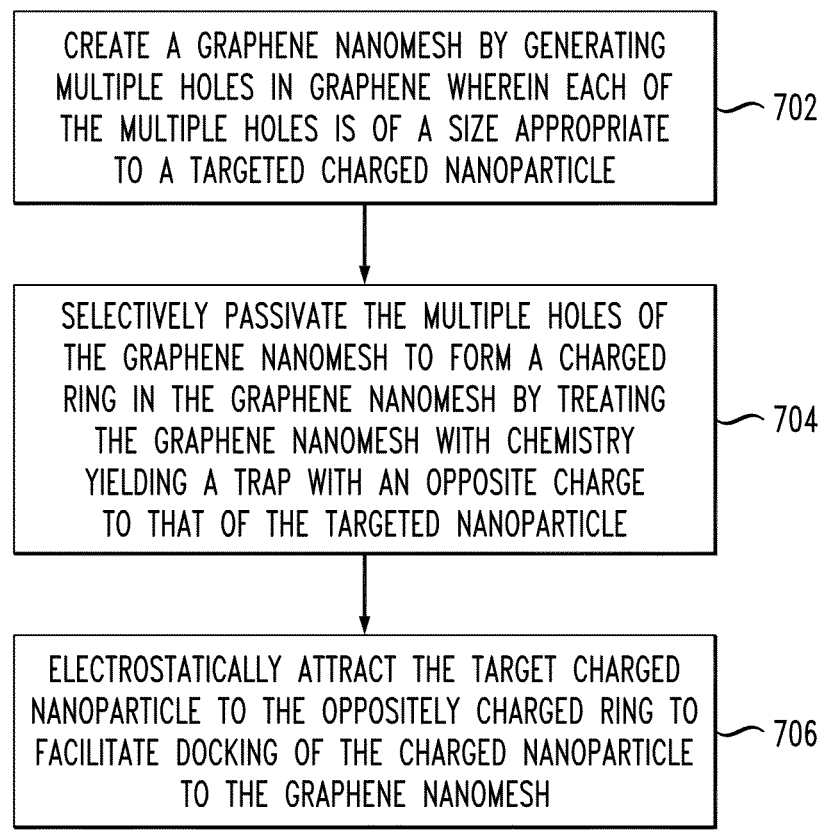
FIG. 7 is a flow diagram illustrating techniques for attracting charged nanoparticles using a graphene nanomesh, according to an embodiment of the present invention.

FIG. 7 is a flow diagram illustrating techniques for attracting charged nanoparticles using a graphene nanomesh, according to an embodiment of the present invention. Step 702 includes creating a graphene nanomesh by generating multiple holes in graphene, wherein each of the multiple holes is of a size appropriate to a targeted charged nanoparticle. Generating multiple holes leaves active carbon sites at edges of the multiple holes.

Additionally, in at least one embodiment of the invention, the generated holes are each of a size in a range of approximately 5-50 nanometers (by way merely of example). As detailed herein, the holes do not have to be circular, and the hole size can be set by the targeted nanoparticle size.

Step 704 includes selectively passivating the multiple holes of the graphene nanomesh to form a charged ring in the graphene nanomesh by treating the graphene nanomesh with chemistry yielding a trap with an opposite charge to that of the targeted nanoparticle. As detailed herein, the charged ring can include a positively charged ring, or a negatively charged ring. Further, an example embodiment of the invention includes generating multiple rings in the graphene nanomesh, wherein the multiple rings include positively charged rings and negatively charged rings.

Additionally, in selectively passivating the multiple holes of the graphene nanomesh, the charge is concentrated in an edge of the multiple holes to form docking positions for the targeted nanoparticle. Further, selectively passivating the multiple holes of the graphene nanomesh can include controlling termination of one or more carbon dangling bonds.

Selectively passivating the multiple holes of the graphene nanomesh to form a charged ring in the graphene nanomesh by treating the graphene nanomesh with chemistry yielding a trap with an opposite charge to that of the targeted nanoparticle can include selectively passivating the multiple holes followed by a treatment with a base to form a ring of negative charge around a perimeter of each hole. Such an embodiment of the invention can include passivating edges of the multiple holes with a hydrogen (H), oxygen (O), or hydroxide (OH) group.

Additionally, selectively passivating the multiple holes of the graphene nanomesh to form a charged ring in the graphene nanomesh by treating the graphene nanomesh with chemistry yielding a trap with an opposite charge to that of targeted nanoparticle can include selectively passivating the multiple holes with an acid to form a ring of positive charge around a perimeter of each hole. Such an embodiment of the invention can include passivating edges of the multiple holes with a NH$_2$ group, passivating edges of the multiple holes with HX, wherein X is a halogen, or passivating edges of the multiple holes with an alkyl halide.

Step 706 includes electrostatically attracting the target charged nanoparticle to the oppositely charged ring to facilitate docking of the charged nanoparticle to the graphene nanomesh.

Figure 8:
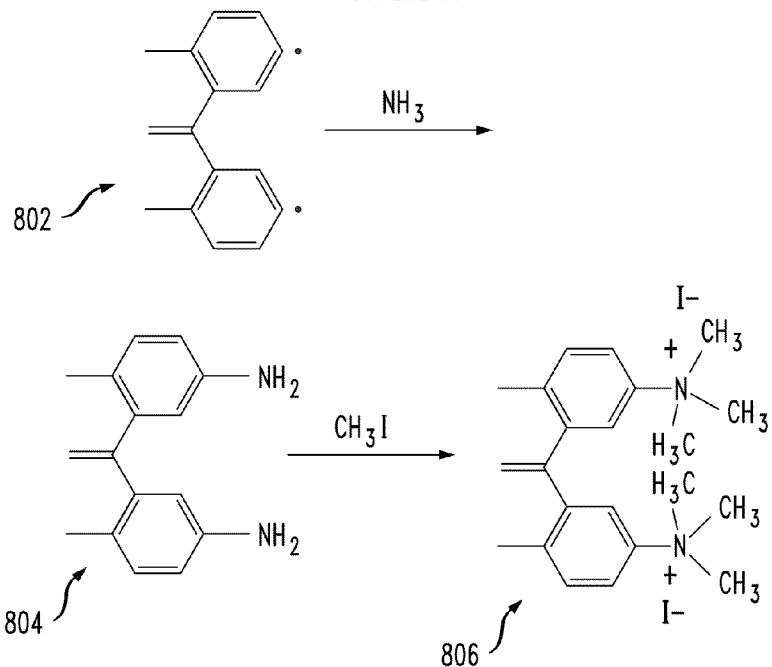
FIG. 8 is a diagram illustrating the chemistry flow of a positive trap, according to an embodiment of the present invention.

FIG. 8 is a diagram illustrating the chemistry flow of a positive trap formation, according to an embodiment of the present invention. By way of illustration, in FIG. 8, in Scheme A, the free radicals-containing graphene nanomesh 802 is exposed to ammonia gas, which results in the formation of amine group (804), which in turn is reacted with excess iodomethane to form quaternary amine salt 806, which bears a positive charge.

Figure 9:
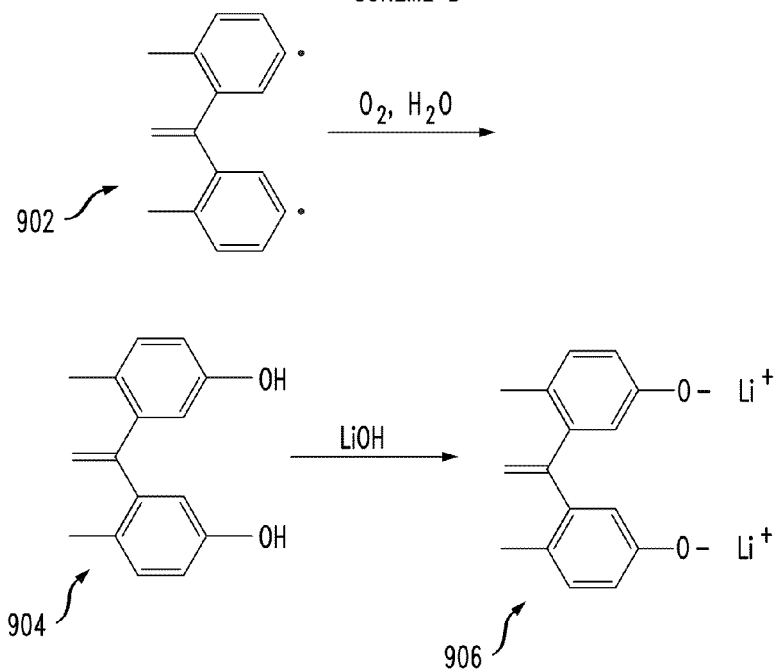
FIG. 9 is a diagram illustrating the chemistry flow of a negative trap, according to an embodiment of the present invention.

FIG. 9 is a diagram illustrating the chemistry flow of a negative trap formation, according to an embodiment of the present invention. By way of illustration in FIG. 9, in scheme B, the free radical 902 is exposed to oxygen and water (ambient), resulting in the formation of a hydroxyl group (either phenols or alcohols), represented by structure 904. Further, treatment of structure 904 with strong bases such as, for example, alkali metal hydroxides converts the phenolic group to phenoxide (906), which carries a negative charge.

As additionally described herein, an aspect of the invention includes a functionalized graphene nanomesh for attracting positively charged nanoparticles. Such a graphene nanomesh includes a graphene sheet with multiple holes generated thereon to form a graphene nanomesh, wherein each of the multiple holes is of a size appropriate to a targeted positively charged nanoparticle, and a negatively charged ring formed in each hole in the graphene nanomesh by selectively passivating the multiple holes followed by a treatment with a base. Each hole can be of a size in a range of approximately 5-50 nanometers, and the negatively charged rings form docking positions for the targeted positively charged nanoparticle.

Further, another aspect of the present invention includes a functionalized graphene nanomesh for attracting negatively charged nanoparticles. As detailed herein, such a graphene nanomesh includes a graphene sheet with multiple holes generated thereon to form a graphene nanomesh, wherein each of the multiple holes is of a size appropriate to a targeted negatively charged nanoparticle, and an amine functionalized graphene nanomesh rendered positively charged with treatment with an acid. Additionally, each hole can be of a size in a range of approximately 5-50 nanometers, and the positively charged rings form docking positions for the targeted negatively charged nanoparticle.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for attracting charged nanoparticles using a graphene nanomesh, comprising:
creating a graphene nanomesh by generating multiple holes in graphene, wherein each of the multiple holes is of a size appropriate to a targeted charged nanoparticle;
selectively passivating the multiple holes of the graphene nanomesh to form a charged ring in the graphene nanomesh by treating the graphene nanomesh with chemistry yielding a trap with an opposite charge to that of the targeted nanoparticle; and
electrostatically attracting the target charged nanoparticle to the oppositely charged ring to facilitate docking of the charged nanoparticle to the graphene nanomesh.

2. The method of claim 1, wherein the charged ring comprises a positively charged ring.

3. The method of claim 1, wherein the charged ring comprises a negatively charged ring.

4. The method of claim 1, further comprising:
generating multiple rings in the graphene nanomesh, wherein the multiple rings include positively charged rings and negatively charged rings.

5. The method of claim 1, wherein generating multiple holes leaves active carbon sites at edges of the multiple holes.

6. The method of claim 1, wherein generating multiple holes in graphene comprises generating multiple holes each of a size in a range of approximately 5-50 nanometers.

7. The method of claim 1, wherein selectively passivating the multiple holes of the graphene nanomesh to form a charged ring in the graphene nanomesh by treating the graphene nanomesh with chemistry yielding a trap with an opposite charge to that of the targeted nanoparticle comprises selectively passivating the multiple holes followed by a treatment with a base to form a ring of negative charge around a perimeter of each hole.

8. The method of claim 1, wherein selectively passivating the multiple holes of the graphene nanomesh to form a charged ring in the graphene nanomesh by treating the graphene nanomesh with chemistry yielding a trap with an opposite charge to that of the targeted nanoparticle comprises selectively passivating the multiple holes with an acid to form a ring of positive charge around a perimeter of each hole.

9. The method of claim 8, wherein selectively passivating the multiple holes of the graphene nanomesh to form a charged ring in the graphene nanomesh by treating the graphene nanomesh with chemistry yielding a trap with an opposite charge to that of the targeted nanoparticle comprises passivating edges of the multiple holes with a $NH_2$ group.

10. The method of claim 8, wherein selectively passivating the multiple holes of the graphene nanomesh to form a charged ring in the graphene nanomesh by treating the graphene nanomesh with chemistry yielding a trap with an opposite charge to that of the targeted nanoparticle comprises passivating edges of the multiple holes with HX, wherein X is a halogen.

11. The method of claim 8, wherein selectively passivating the multiple holes of the graphene nanomesh to form a charged ring in the graphene nanomesh by treating the graphene nanomesh with chemistry yielding a trap with an opposite charge to that of the targeted nanoparticle comprises passivating edges of the multiple holes with an alkyl halide.

12. The method of claim 1, wherein selectively passivating the multiple holes of the graphene nanomesh to form a charged ring in the graphene nanomesh by treating the graphene nanomesh with chemistry yielding a trap with an opposite charge to that of the targeted nanoparticle, wherein the charge is concentrated in an edge of the multiple holes to form docking positions for the targeted nanoparticle.

13. The method of claim 1, wherein selectively passivating the multiple holes of the graphene nanomesh to form a charged ring in the graphene nanomesh by treating the graphene nanomesh with chemistry yielding a trap with an opposite charge to that of the targeted nanoparticle comprises controlling termination of one or more carbon dangling bonds.

14. A functionalized graphene nanomesh for attracting positively charged nanoparticles, comprising:
   a graphene sheet with multiple holes generated thereon to form a graphene nanomesh, wherein each of the multiple holes is of a size appropriate to a targeted positively charged nanoparticle; and
   a negatively charged ring formed in each hole in the graphene nanomesh by selectively passivating the multiple holes followed by a treatment with a base.

15. The functionalized graphene nanomesh of claim 14, wherein each hole is of a size in a range of approximately 5-50 nanometers.

16. The functionalized graphene nanomesh of claim 14, wherein the negatively charged rings form docking positions for the targeted positively charged nanoparticle.

17. A functionalized graphene nanomesh for attracting negatively charged nanoparticles, comprising:
   a graphene sheet with multiple holes generated thereon to form a graphene nanomesh, wherein each of the multiple holes is of a size appropriate to a targeted negatively charged nanoparticle; and
   an amine functionalized graphene nanomesh rendered positively charged with treatment with an acid.

18. The functionalized graphene nanomesh of claim 17, wherein each hole is of a size in a range of approximately 5-50 nanometers.

19. The functionalized graphene nanomesh of claim 17, wherein the positively charged rings form docking positions for the targeted negatively charged nanoparticle.

* * * * *

UNITED STATES PATENT AND TRADEMARK OFFICE
CERTIFICATE OF CORRECTION

PATENT NO.         : 8,835,686 B2
APPLICATION NO.    : 13/302242
DATED              : September 16, 2014
INVENTOR(S)        : Ali Afzali-Ardakani, Ahmed Maarouf and Glenn J. Martyna It is certified that error appears in the above-identified patent and that said Letters Patent is hereby corrected as shown below:

Title Page, Item (73)
Under "Assignee," please add "EGYPT NANOTECHNOLOGY CENTER."

Signed and Sealed this
Fifteenth Day of March, 2016

Michelle K. Lee
*Director of the United States Patent and Trademark Office*